Oct. 14, 1969 R. F. E. WINN 3,473,048
FREQUENCY-TO-VOLTAGE CONVERTER WITH TEMPERATURE COMPENSATING DIODE
Filed Dec. 5, 1966
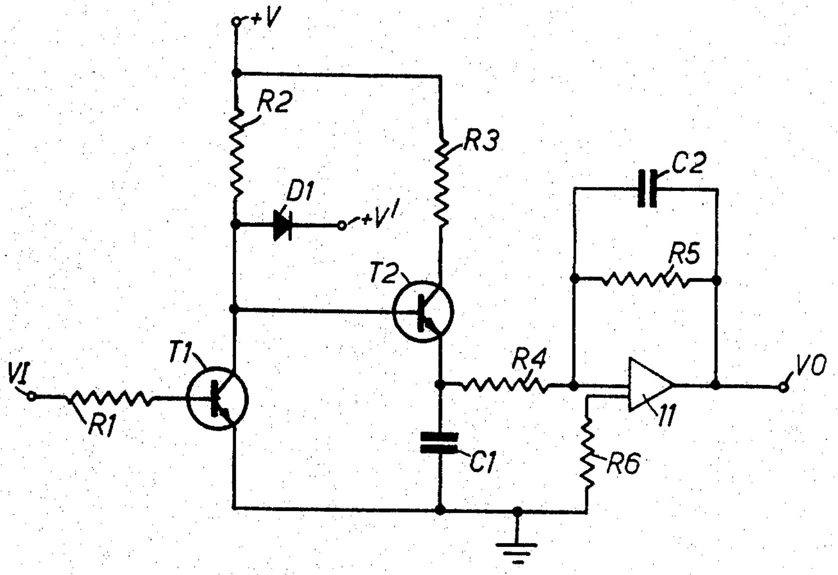
INVENTOR.
ROGER FREDERICK EDWARD WINN
BY
ATTORNEY United States Patent Office 3,473,048
Patented Oct. 14, 1969

3,473,048

FREQUENCY-TO-VOLTAGE CONVERTER WITH TEMPERATURE COMPENSATING DIODE

Roger F. E. Winn, London, England, assignor to Elliott Brothers (London) Limited, London, England, a British company Filed Dec. 5, 1966, Ser. No. 599,110
Int. Cl. H03k 5/20
U.S. Cl. 307—233 7 Claims

ABSTRACT OF THE DISCLOSURE

A circuit for producing an output magnitude proportional to an input frequency is shown comprising a capacitor in series with the base-emitter path of a transistor which is rendered conductive at the input frequency so as repeatedly to cause the capacitor to be charged to the same voltage. The capacitor repeatedly completely discharges into an amplifier so that the rate of flow of charge into, and the output from, the amplifier is dependent only on the input frequency.

The invention relates to electrical circuits for frequency-to-voltage conversion.

According to the invention, there is provided an electrical circuit for producing an output having a magnitude dependent on the pulse repetition frequency of a series of input pulses, comprising capacitive means, switching means responsive to the input pulses for connecting the capacitive means to be charged to a constant predetermined voltage in response to each said pulse, and smoothing means connected to discharge the capacitive means between consecutive said pulses to produce the said output dependent on the mean value of the discharge current.

According to the invention, there is further provided a frequency-to-voltage converting circuit for producing an output voltage having a magnitude dependent on the repetition frequency of a series of narrow input pulses, comprising capacitive means having a charge path and a discharge path, switching means connected to control said charge path and responsive to each said input pulse for connecting a source of constant voltage to the said charge path for the duration of each said input pulse, and smoothing means connected in said discharge path for producing a said output voltage dependent on the means value of the discharge current of the capacitive means, the time constant of the discharge path of the capacitive means being such that the capacitive means is substantially completely discharged between consecutive said input pulses.

An electrical frequency-to-voltage converter, embodying the invention, will now be described by way of example, and with reference to the accompanying drawing which shows a circuit diagram of the converter.

The frequency-to-voltage converter has an input terminal VI connected through a resistor R1 to the base of an n-p-n transistor T1 whose emitter is earthed and whose collector is connected through a resistor R2 to a terminal +V held at a positive voltage. The collector of transistor T1 is also connected through a diode D1, to a terminal +V′ held at a stable reference positive voltage less than the voltage of terminal +V, and to the base of a further n-p-n transistor T2 which is connected in emitter follower configuration.

The collector of transistor T2 is connected through a current limiting resistor R3 to the terminal +V. The emitter of transistor T2 is connected to one side of a capacitor C1, whose other side is connected to earth, and to the input of a D.C. operational amplifier 11 through a resistor R4.

A capacitor C2 and a resistor R5 are connected in parallel with the operational amplifier 11. A resistor R6 earths a further input of the amplifier 11. The resistors R5 and R4 control the gain of the amplifier 11. The output from amplifier 11 is connected to an output terminal VO.

In operation, a positive input voltage having a series of zero going pulses each of whose duration is short compared with the pulse repetition frequency, is applied to input terminal VI and fed to the base electrode of transistor T1 through resistor R1. Hence, transistor T1 is normally conducting and is switched "off" for the duration of each pulse. Thus the output at the collector of transistor T1, which is fed to the base of transistor T2, comprises a series of positive-going pulses each of whose duration is equal to that of an input pulse. As the voltage applied to terminal +V is greater than that applied to terminal +V′, the amplitude of each pulse at the collector of transistor T1 is equal to the sum of the reference voltage applied to terminal +V′ and the volt drop across diode D1.

The base to emitter volt drop of transistor T2 is chosen to have the same value as, but opposite sign to, that of diode D1 and both transistors, as well as diode D1, are silicon semiconductor devices having a low leakage characteristic. Hence, the emitter of transistor T2 rises to the reference voltage applied to terminal +V′ each time transistor T1 is switched "off" by an input pulse, so causing capacitor C1 to charge up to this reference voltage for each input pulse. Between input pulses, capacitor C1 discharges relatively slowly through resistor R4 into the input of amplifier 11. The capacitor C2 smooths the input to amplifier 11 and hence there is produced at output terminal VO a relatively smooth D.C. voltage.

The time constant of capacitor C1 and resistor R4 is arranged to be not more than about one-fifth of the shortest expected time between adjacent input pulses. This ensures that even at the highest expected pulse repetition frequency the capacitor C1 is substantially completely discharged through resistor R4 between consecutive input pulses. Thus, the amount of charge flowing into amplifier 11 is constant for each input pulse repetition frequency; therefore, the average rate of flow of charge into the amplifier 11 is proportional to the pulse repetition frequency. Hence the average input current into, and the average output voltage from, the amplifier 11 is proportional to the pulse repetition frequency. As the volt drop and leakage characteristics of the diode D1 and the base-emitter path of transistor T2 are equal, the voltage which capacitor C1 charges to is equal to the stable reference voltage at terminal +V′; in addition, the values of the capacitor C1 and the resistor R4 which determine the discharge rate of capacittor C1 can be made substantially constant; therefore, the output of the amplifier 11 is directly proportional to the pulse repetition frequency of the input pulses and is substantially independent of changes in ambient conditions.

The output voltage at terminal VO does not depend on the pulse width since the area under the discharge current waveform of capacitor C1 for the duration of each pulse is short compared with that during the discharge time.

What I claim is:

1. An electrical circuit for producing an output signal having a magnitude dependent on the repetition frequency of a series of input pulses, comprising capacitive means, a source of constant predetermined voltage, a transistor, means connected to the transistor and operative to switch the transistor from a first to a second stage in response to each said input pulse, a diode connected between the said source and the said transistor, means connecting the said transistor to the capacitive means whereby the said constant voltage is applied to the said capacitive means through the diode and part of the said transistor each time the transistor is switched into the second state and charges the capacitive means to the constant predetermined voltage, the voltage drop in the said part of the transistor being opposite to, and substantially equal to, the voltage drop across the said diode, the diode and the transistor being substantially equally responsive to ambient environmental changes, and smoothing means connected to the capacitive means to discharge the capacitive means between consecutive said input pulses so as to produce the said output dependent on the mean value of the discharge current.

2. A circuit according to claim 1, in which the said smoothing means provides a discharge path having a time constant such that the capacitive means is substantially completely discharged between consecutive said input pulses.

3. A circuit according to claim 1, in which the means for switching the said transistor comprises a further transistor.

4. A circuit according to claim 1, in which the said transistor is connected to the said capacitive means in emitter-follower configuration with its base-emitter circuit constituting the said part of the transistor, the base-emitter voltage drop in the transistor being substantially equal and opposite to the voltage drop across the said diode.

5. A circuit according to claim 1, in which the diode is a silicon semi-conductor diode and said transistor is a silicon transistor.

6. A circuit according to claim 1, in which the discharge time constant of the capacitive means is less than one-fifth of the elapsed time between consecutive said input pulses.

7. A circuit according to claim 1, in which the smoothing means comprises an operational amplifier.

References Cited

UNITED STATES PATENTS

| | | | |
|---|---|---|---|
| 3,049,631 | 8/1962 | Taylor ____________ | 324—78 X |
| 3,056,047 | 9/1962 | Cooke-Yarborough __ | 307—233 |
| 3,156,115 | 11/1964 | Adelmann. | |
| 3,205,448 | 9/1965 | Bahrs et al. ______ | 307—233 X |
| 3,219,940 | 11/1965 | Cooke-Yarborough _ | 307—233 X |

OTHER REFERENCES

Millman and Taub: Pulse, Digital, and Switching Waveforms, 1965, pp. 296, 297.

JOHN S. HEYMAN, Primary Examiner

J. D. FREW, Assistant Examiner

U.S. Cl. X.R.

307—229, 246, 310; 329—107